(12) United States Patent
Hillis et al.

(10) Patent No.: US 8,059,507 B2
(45) Date of Patent: Nov. 15, 2011

(54) DATA STORAGE DEVICE CONTAINER

(75) Inventors: W. Daniel Hillis, Encino, CA (US);
Roderick A. Hyde, Redmond, WA (US);
Muriel Y. Ishikawa, Livermore, CA (US);
Edward K. Y. Jung, Bellevue, WA (US);
Nathan P. Myhrvold, Medina, WA (US);
Lowell L. Wood, Jr., Bellevue, WA (US)

(73) Assignee: The Invention Science Fund I, Bellevue, WA (US)

( * ) Notice: Subject to any disclaimer, the term of this patent is extended or adjusted under 35 U.S.C. 154(b) by 382 days.

(21) Appl. No.: 12/287,883

(22) Filed: Oct. 14, 2008

(65) Prior Publication Data

US 2009/0109803 A1     Apr. 30, 2009

Related U.S. Application Data

(63) Continuation-in-part of application No. 10/987,211, filed on Nov. 12, 2004, now Pat. No. 7,443,777.

(51) Int. Cl.
*G11B 7/00* (2006.01)

(52) U.S. Cl. ........................ 369/52.1; 369/100

(58) Field of Classification Search .............. 369/100, 369/271, 13.01, 30.64, 47.1, 47.36, 47.39, 369/47.42, 52.1, 53.11; 713/168; 206/308.1, 206/472, 232; 720/718; 340/572.1, 572.8, 340/539.13; 235/492; 710/16, 8, 9; 700/226, 700/56; 702/184; 709/210
See application file for complete search history.

(56) References Cited

U.S. PATENT DOCUMENTS

| | | | |
|---|---|---|---|
| 4,811,319 A | 3/1989 | Ikedo et al. | |
| 5,862,117 A * | 1/1999 | Fuentes et al. | 369/100 |
| 6,246,642 B1 | 6/2001 | Gardner, Jr. et al. | |
| 6,249,227 B1 * | 6/2001 | Brady et al. | 340/572.1 |
| 6,367,623 B1 | 4/2002 | Tully et al. | |
| 6,738,903 B1 * | 5/2004 | Haines | 713/168 |
| 7,023,344 B2 * | 4/2006 | Schaper | 340/572.4 |
| 7,149,658 B2 * | 12/2006 | Kadaba | 702/184 |
| 7,183,920 B2 * | 2/2007 | Napolitano | 340/572.1 |
| 7,221,536 B2 | 5/2007 | Cox et al. | |
| 7,234,154 B2 * | 6/2007 | Lenssen et al. | 720/718 |
| 7,318,524 B2 * | 1/2008 | Compton et al. | 206/308.1 |

FOREIGN PATENT DOCUMENTS

WO      WO02/05204      1/2002

* cited by examiner

*Primary Examiner* — Nabil Hindi
(74) *Attorney, Agent, or Firm* — Suiter Swantz pc llo

(57) ABSTRACT

A method of storing a data storage device includes but is not limited to emplacing a data storage device in a container, the container having surfaces; and writing storable data to the data storage device by transmitting energy through a surface of the container. In addition to the foregoing, other method aspects are described in the claims, drawings, and text forming a part of the present application. Other methods and apparatuses are also disclosed.

37 Claims, 20 Drawing Sheets

DATA STORAGE DEVICE CONTAINER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 10/987,211, entitled Data Storage Device Container, naming W. Daniel Hillis, Roderick A. Hyde, Muriel Y. Ishikawa, Edward K. Y. Jung, Nathan P. Myhrvold, Lowell L. Wood, Jr. as inventors, filed Nov. 12, 2004 now U.S. Pat. No. 7,443,777, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates, in general, to packaging data storage devices.

SUMMARY

In one aspect, a method of storing a data storage device includes but is not limited to emplacing a data storage device in a container, the container having surfaces; and writing storable data to the data storage device by transmitting energy through a surface of the container. In addition to the foregoing, other method aspects are described in the claims, drawings, and text forming a part of the present application.

In another aspect, a container for a data storage device includes, but is not limited to a receptacle configured to receive the data storage device; and at least one data storage surface through which storable data may be written to the data storage device by transmitted energy after the digital storage device is received. In addition to the foregoing, other container aspects are described in the claims, drawings, and text forming a part of the present application.

In another aspect, a system of containing a data storage device includes but is not limited to a container including a receptacle to receive the data storage device, the container including at least one surface through which storable data may be written to the data storage device by transmitted energy after the data storage device is received; circuitry for generating the transmitted energy; circuitry for receiving the transmitted energy; and circuitry for writing the storable data to the data storage device. In addition to the foregoing, other system aspects are described in the claims, drawings, and text forming a part of the present application.

In another aspect, a method includes but is not limited to admitting transmitted energy by which storable data may be written to a data storage device after the data storage device has been received into a container; receiving the transmitted energy; and writing the storable data to the data storage device. In addition to the foregoing, other method aspects are described in the claims, drawings, and text forming a part of the present application.

In one or more various aspects, related systems include but are not limited to circuitry and/or programming and/or electro-mechanical devices and/or optical devices for effecting the herein-referenced method aspects; the circuitry and/or programming and/or electro-mechanical devices and/or optical devices can be virtually any combination of hardware, software, and/or firmware configured to effect the herein-referenced method aspects depending upon the design choices of the system designer skilled in the art.

In another aspect, a method of storing data on a data storage device emplaced in a container includes but is not limited to positioning a data storage device to receive storable data, wherein the data storage device has been emplaced in a container, and wherein the container has a surface through which the storable data can be received by the data storage device; and writing the storable data to the data storage device by transmitting energy through the surface of the container through which the storable data can be received by the data storage device. In addition to the foregoing, other method aspects are described in the claims, drawings, and text forming a part of the present application.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the detailed description set forth herein.

BRIEF DESCRIPTION OF THE FIGURES

The use of the same symbols in different drawings typically indicates similar or identical items.

DETAILED DESCRIPTION

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

Figure 1:
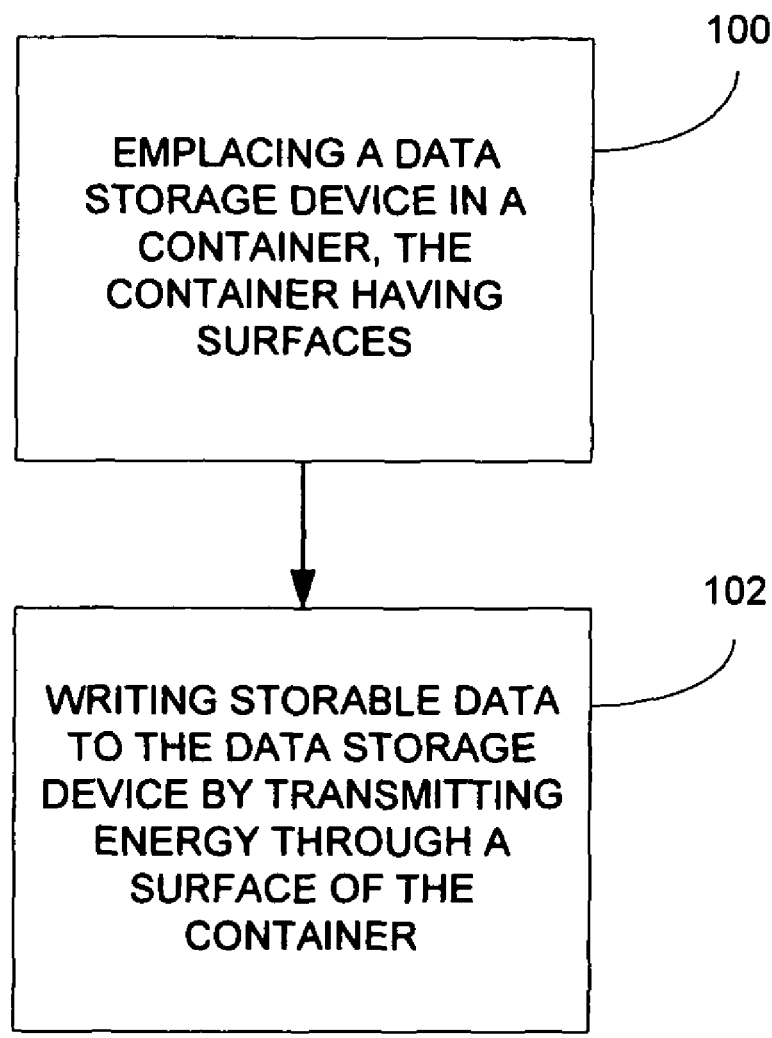
FIG. 1 is a flowchart depicting an embodiment of the subject matter of the present application.

With reference now to FIG. 1, shown is an example of a method of storing a data storage device. The method shown includes emplacing a data storage device in a container, the container having surfaces (step 100); and writing storable data to the data storage device by transmitting energy through a surface of the container (step 102). Those skilled in the art will appreciate that as used herein the term "stored data" can include ephemerally stored data. For example, data created and then immediately transmitted would constitute stored data in that such data will tend to be resident at its place of creation and/or point of transmission for some finite amount of time, however ephemeral.

Figure 2:
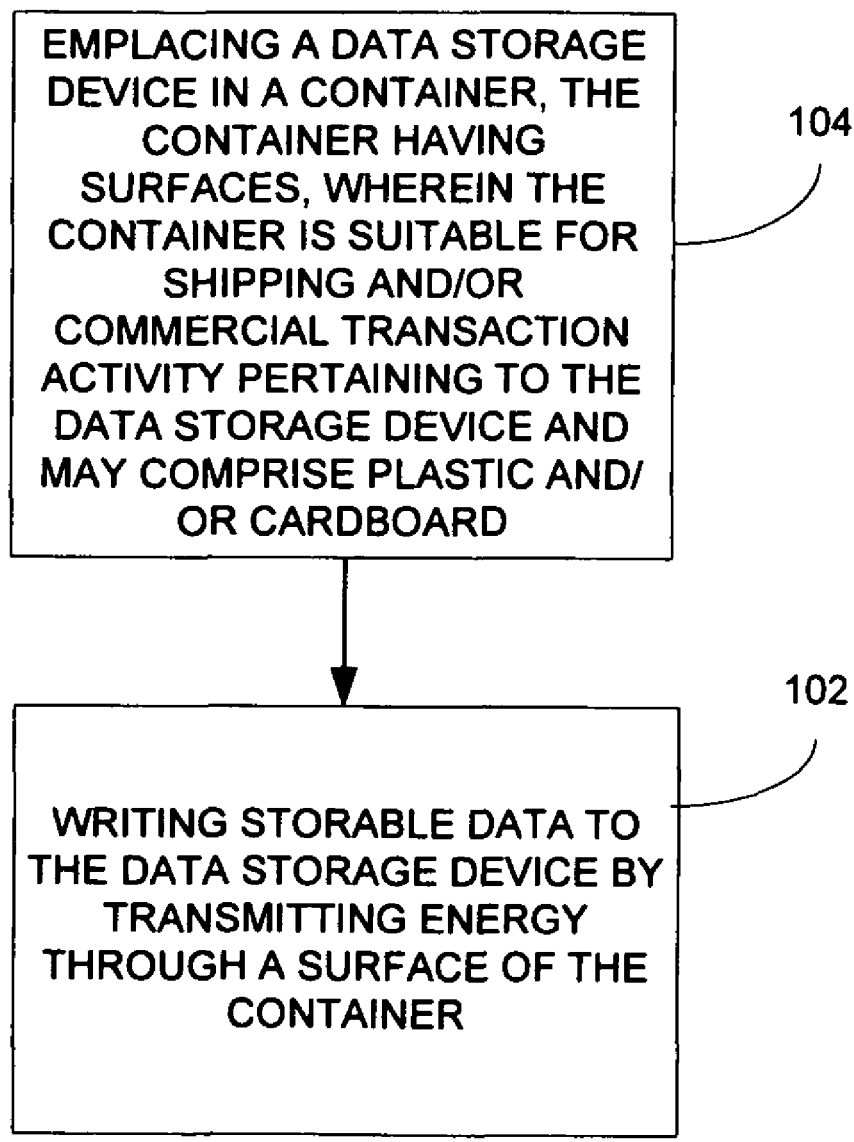
FIG. 2 is a flowchart depicting another embodiment of the subject matter of the present application.

FIG. 2 shows another embodiment, a method of storing a data storage device that includes step 102 and step 104, emplacing a data storage device in a container, the container having surfaces, wherein the container is suitable for shipping the data storage device and includes plastic or cardboard or both, and/or wherein the container is suitable for commercial transaction activity pertaining to the data storage device, e.g., display and sale or rental to customers, and includes plastic or cardboard or both.

Figure 3:
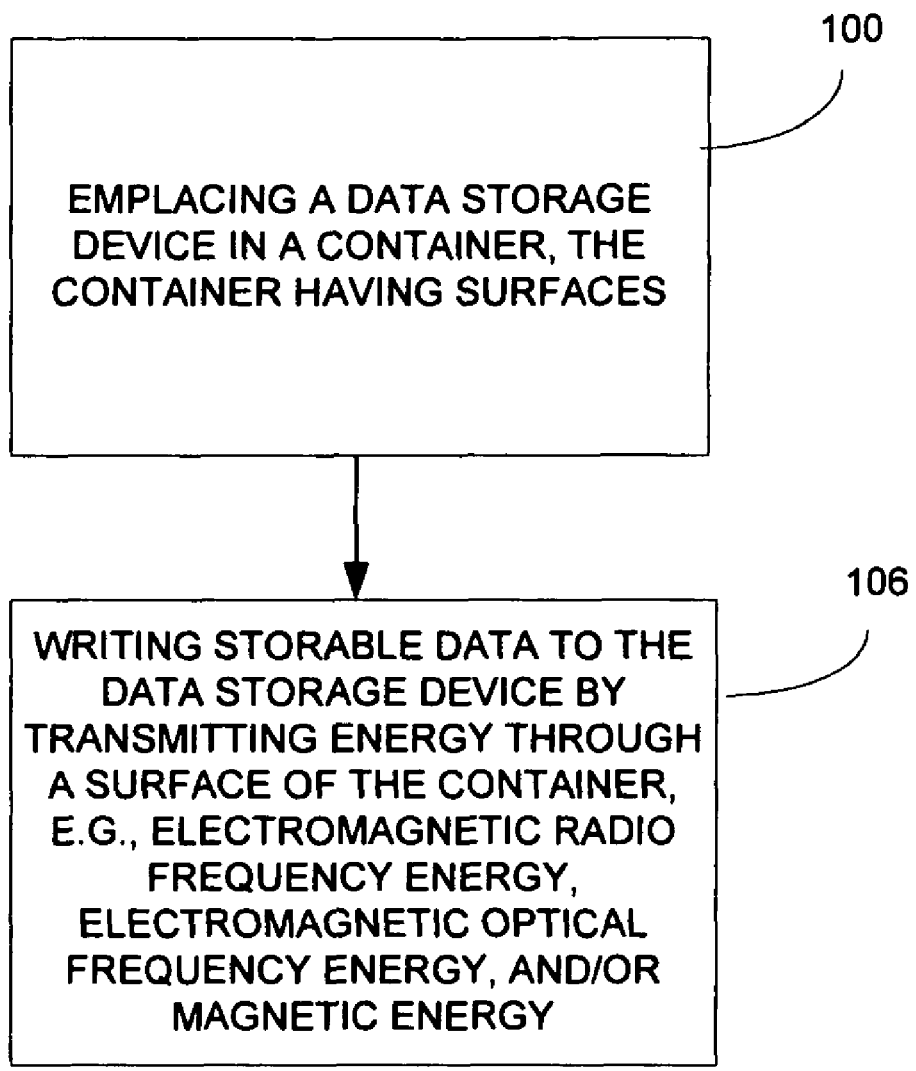
FIG. 3 is a flowchart depicting another embodiment.

Another embodiment is depicted in FIG. 3, a method of storing a data storage device that includes step 100 and step 106, writing storable data to the data storage device by transmitting energy through a surface of the container, wherein the writing storable data by transmitting energy through a surface of the container includes transmitting electromagnetic energy, e.g., radio frequency or optical frequency energy, or transmitting magnetic energy.

Figure 4:
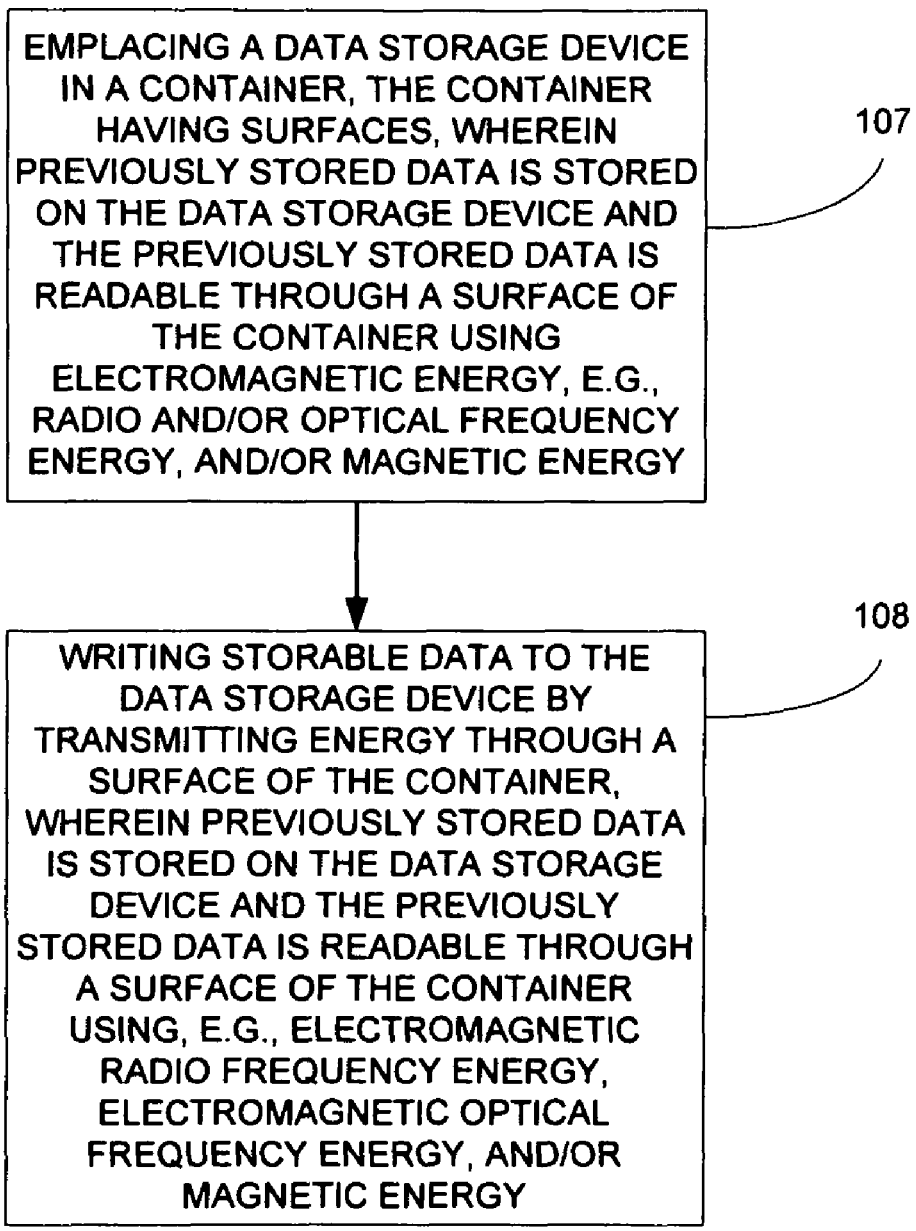
FIG. 4 is a flowchart depicting another embodiment.

FIG. 4 shows another embodiment, a method of storing a data storage device that includes step 107, emplacing a data storage device in a container, the container having surfaces, wherein previously stored data is stored on the data storage device and the previously stored data is readable through a surface of the container using electromagnetic energy, e.g., radio and/or optical frequency energy, and/or magnetic energy. The method also includes step 108, writing storable data to the data storage device by transmitting energy through a surface of the container, wherein previously stored data is stored on the data storage device and the previously stored data is readable through a surface of the container using electromagnetic energy, e.g., radio frequency or optical frequency energy, or using magnetic energy.

Figure 5:
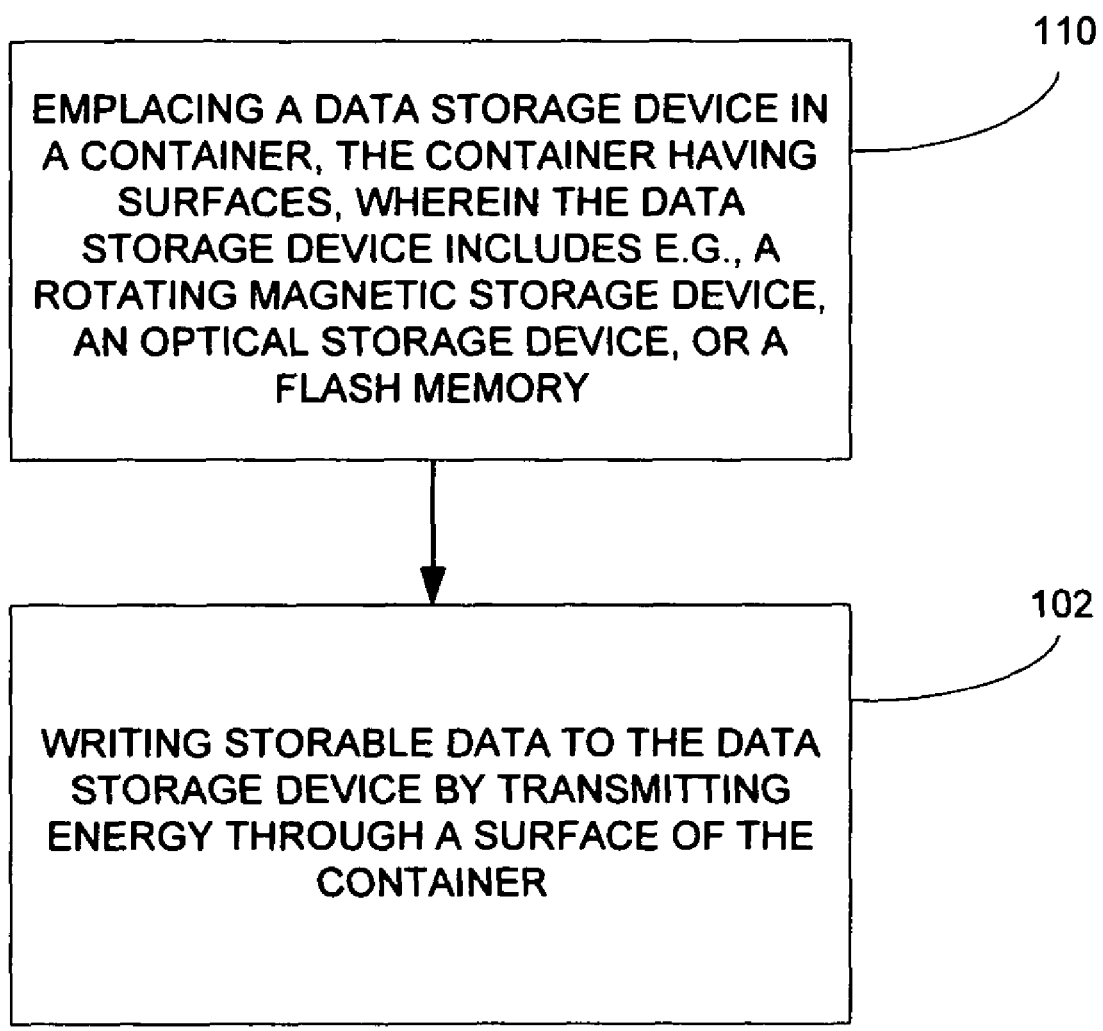
FIG. 5 is a flowchart depicting another embodiment.

Another embodiment, a method of storing a data storage device, is illustrated in FIG. 5. This embodiment includes step 102 and, in addition, emplacing a data storage device in a container, the container having surfaces, wherein the data storage device includes, e.g., a rotating magnetic storage device, an optical storage device, and/or a flash memory (step 110).

Figure 6:
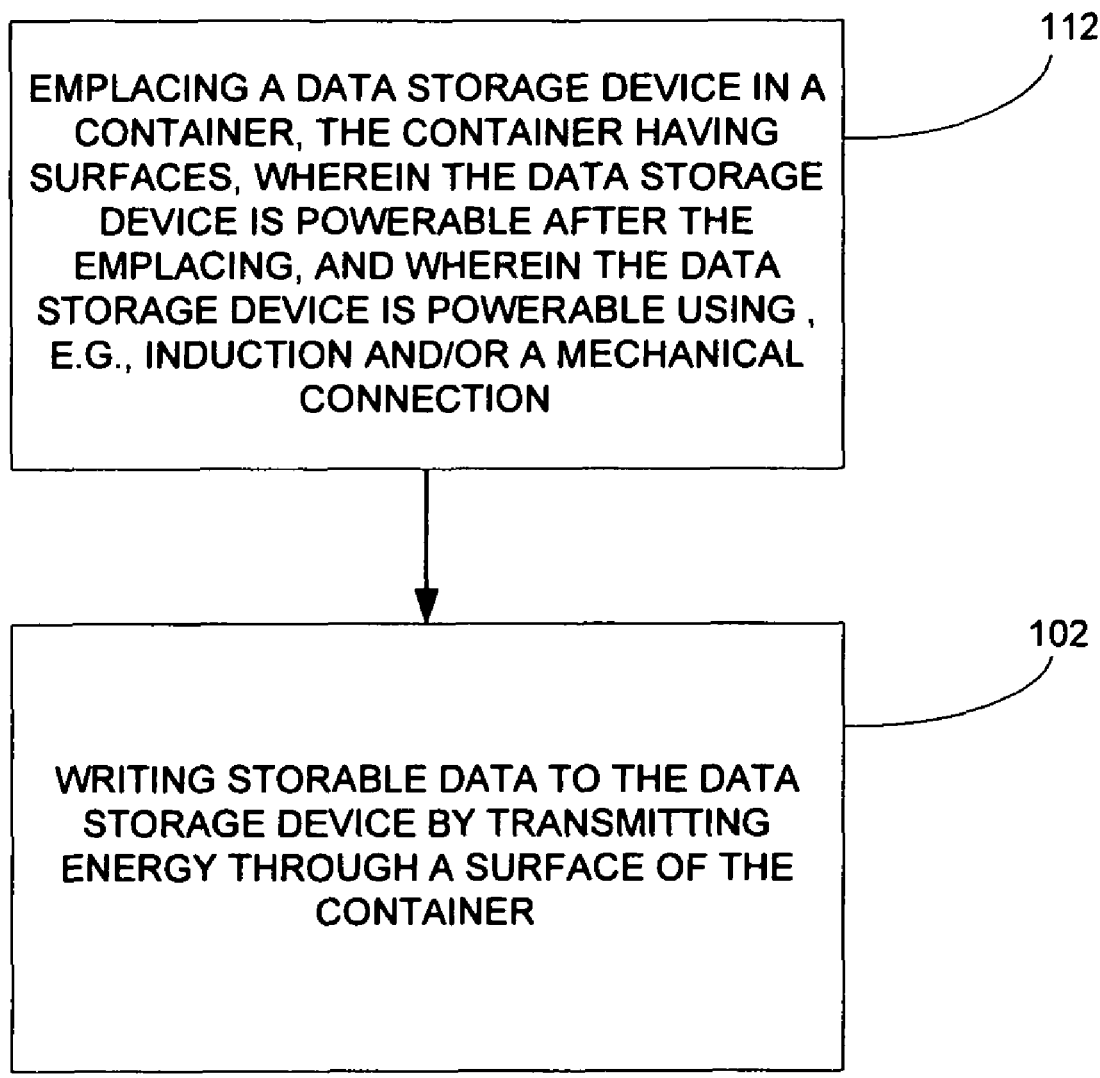
FIG. 6 is a flowchart depicting another embodiment.

FIG. 6 depicts another embodiment, a method of storing a data storage device, including step 102 and step 112, emplacing a data storage device in a container, the container having surfaces, wherein the data storage device is powerable after emplacing the data storage device in the container, e.g., using induction or using a mechanical connection.

Figure 7:
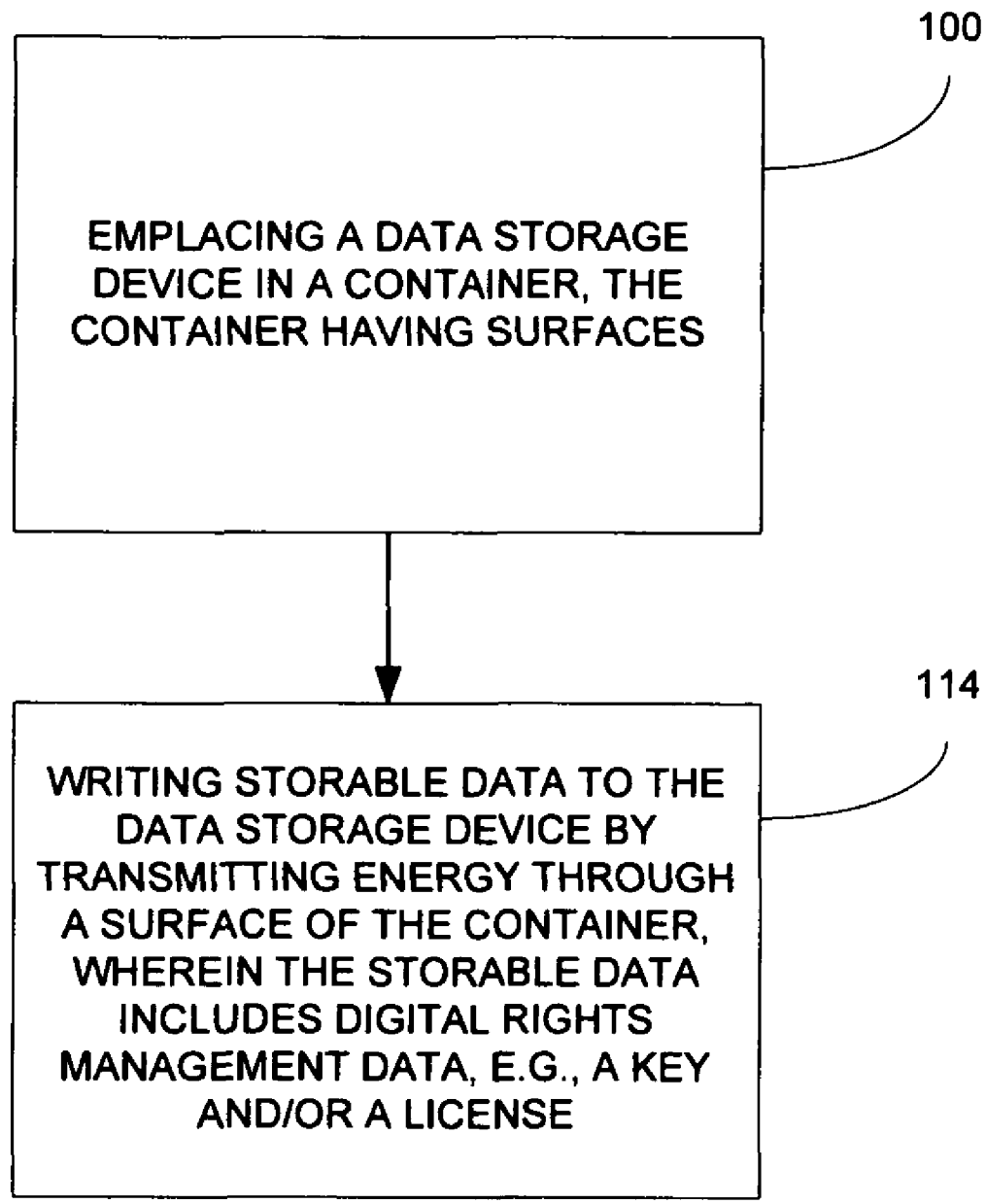
FIG. 7 is a flowchart depicting another embodiment.

Another embodiment is shown in FIG. 7, a method of storing a data storage device, including step 100 and step 114, writing storable data to the data storage device by transmitting energy through a surface of the container, wherein the storable data includes digital rights management data pertaining to the use of storable data stored on the data storage device, e.g., a key and/or a license.

Figure 8:
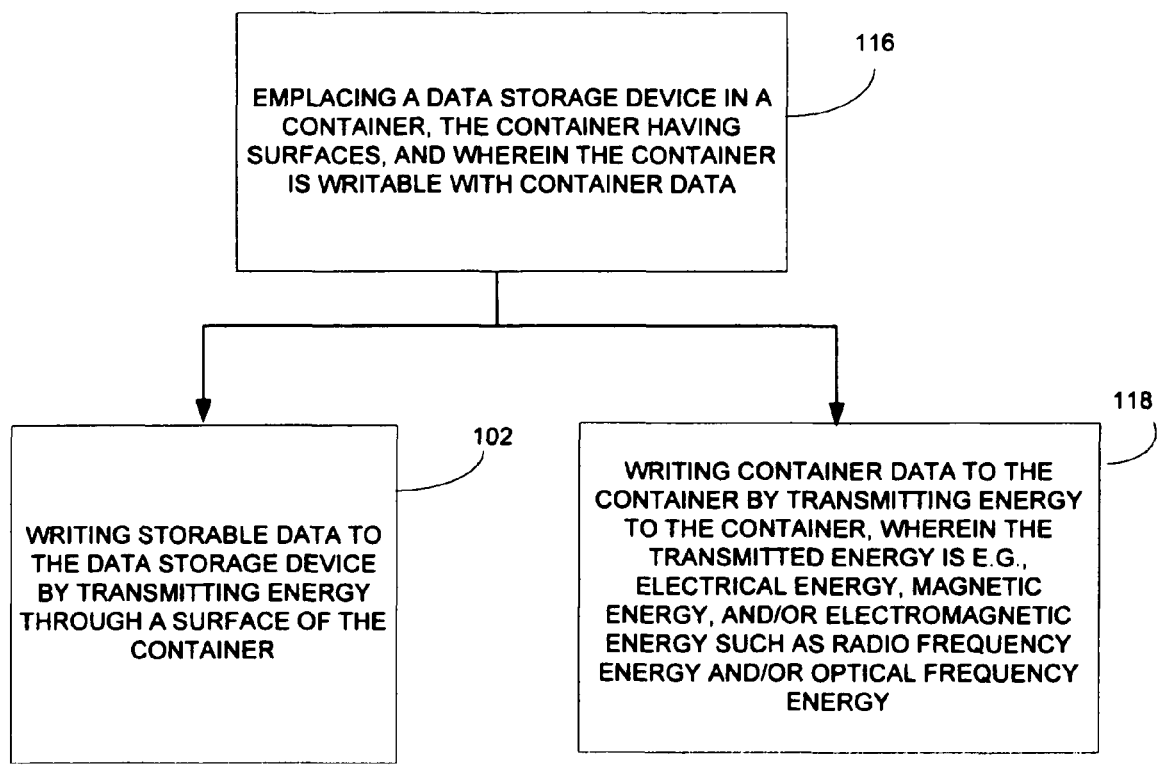
FIG. 8 is a flowchart depicting another embodiment.

FIG. 8 depicts another embodiment, a method of storing a data storage device, including step 102, and in addition step 116, emplacing a data storage device in a container, the container having surfaces wherein the container is writable with container data and step 118, writing container data to the container by transmitting energy to the container, wherein the transmitted energy is, e.g., electrical energy, magnetic energy, and/or electromagnetic energy such as radio frequency energy and/or optical frequency energy.

Figure 9:
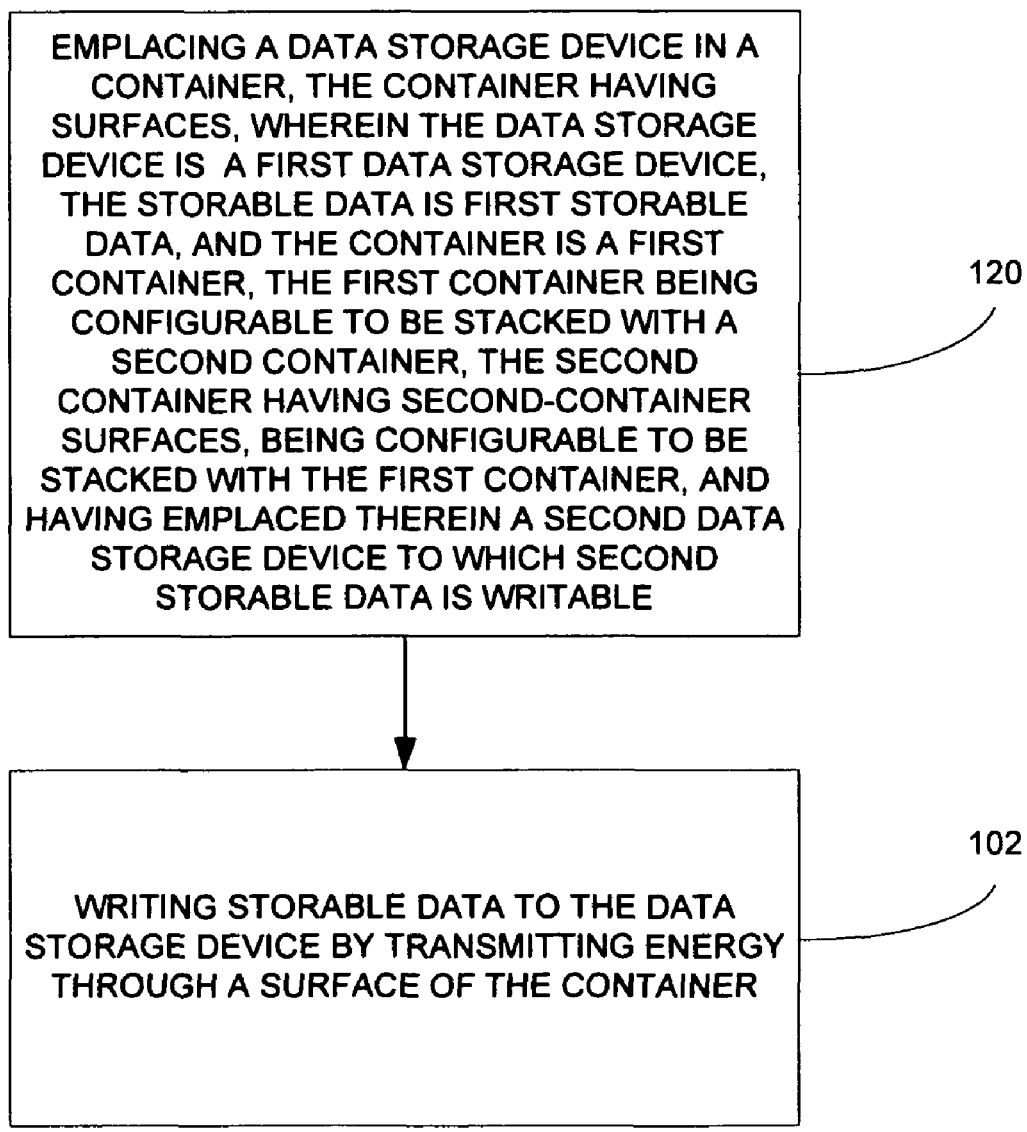
FIG. 9 is a flowchart depicting another embodiment.

Another embodiment, a method of storing a data storage device, is shown in FIG. 9, including step 102 and step 120, emplacing a data storage device in a container, the container having surfaces wherein the data storage device is a first data storage device, the storable data is first storable data, and the container is a first container, the first container being configurable to be stacked with a second container, the second container having second-container surfaces, being configurable to be stacked with the first container, and having emplaced therein a second data storage device to which second storable data is writable.

Figure 10:
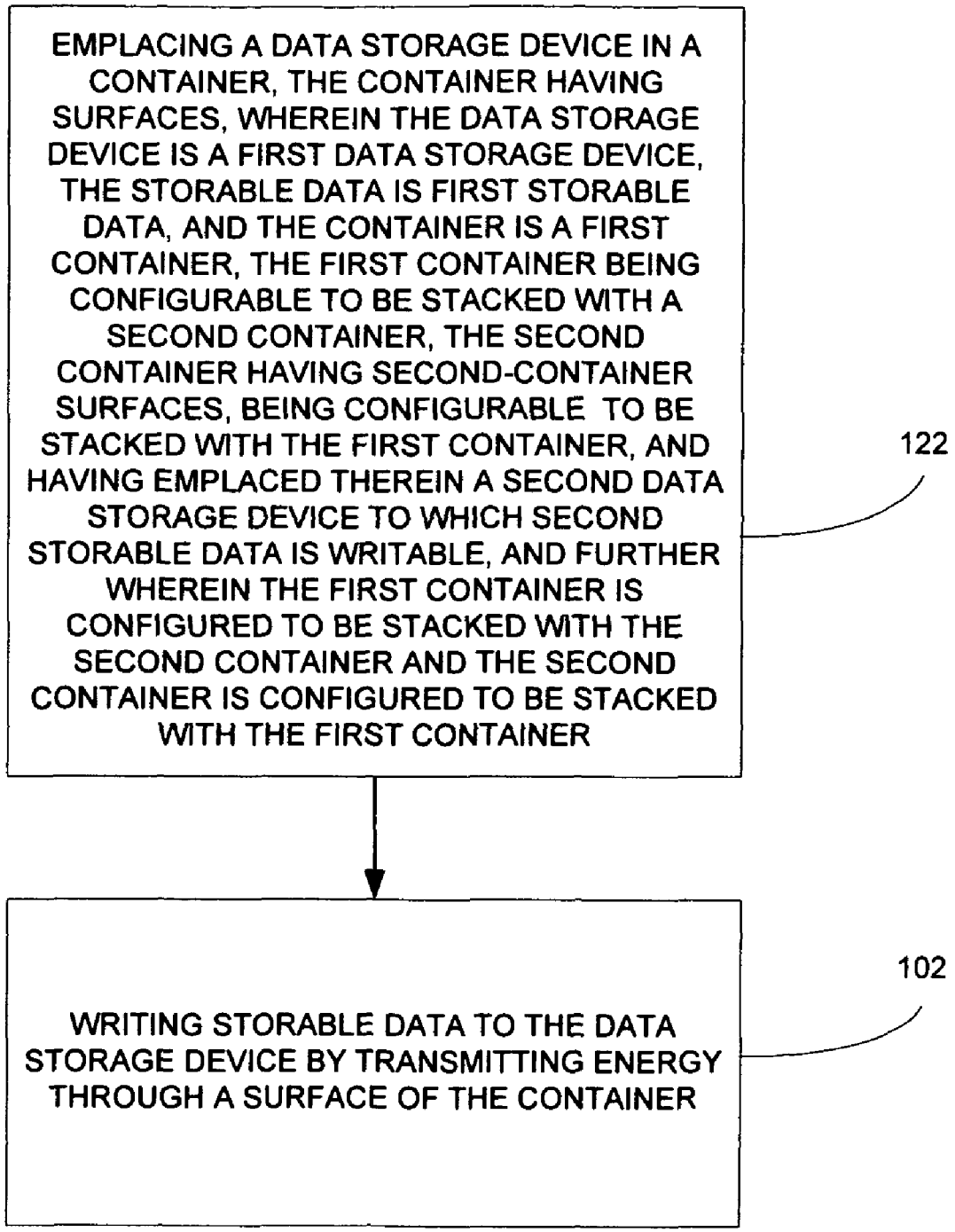
FIG. 10 is a flowchart depicting another embodiment.

FIG. 10 shows another embodiment, a method of storing a data storage device, that includes step 102, and in addition, step 122, emplacing a data storage device in a container, the container having surfaces, wherein the data storage device is a first data storage device, the storable data is first storable data, and the container is a first container, the first container being configurable to be stacked with a second container, the second container having second-container surfaces, being configurable to be stacked with the first container, and having emplaced therein a second data storage device to which second storable data is writable, and further, wherein the first container is configured to be stacked with the second container and the second container is configured to be stacked with the first container.

Figure 11:
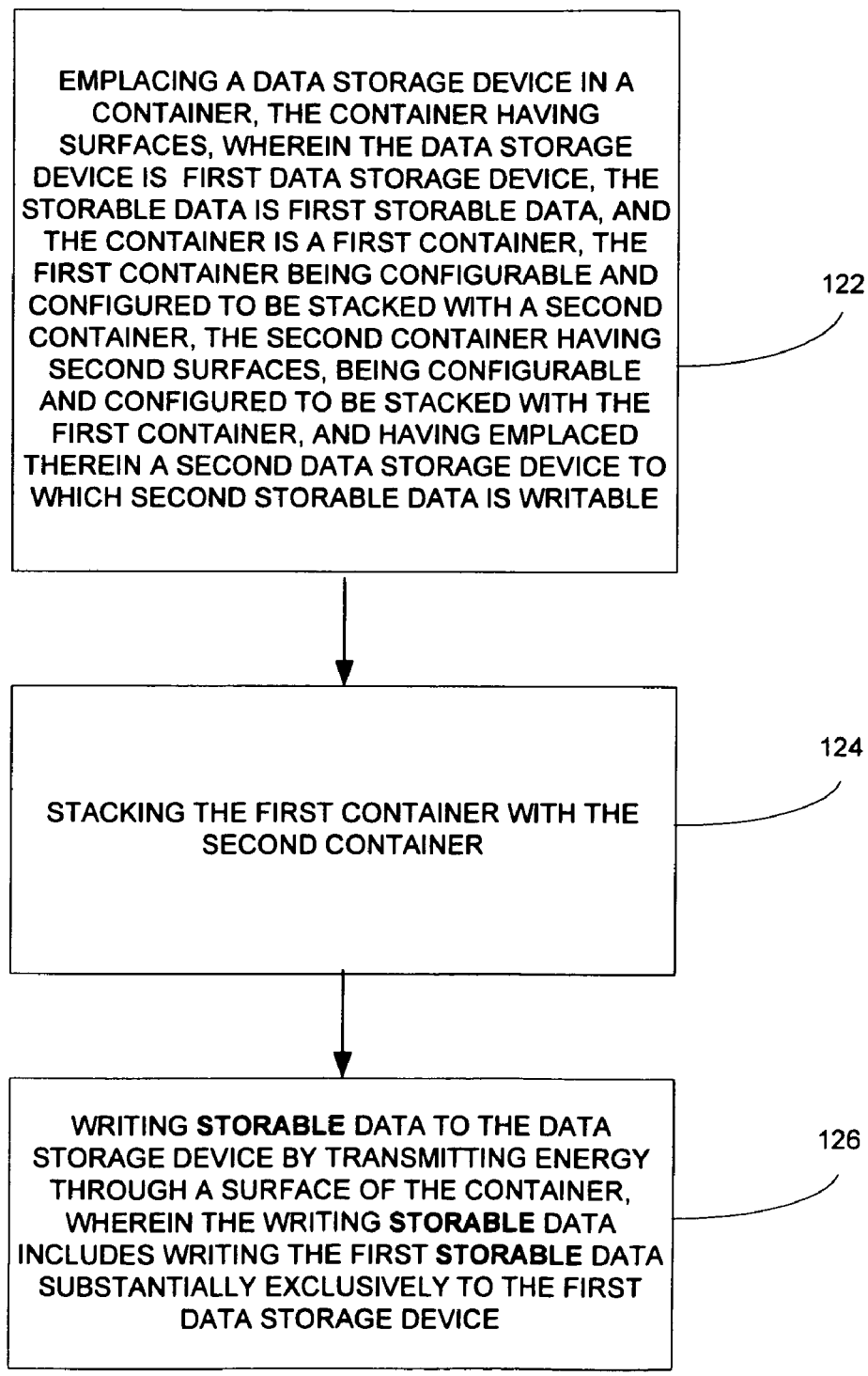
FIG. 11 is a flowchart depicting another embodiment.

Another embodiment is depicted in FIG. 11, a method of storing a data storage device, including steps 102 and 122 and, in addition, step 124, stacking the first container with the second container.

Figure 12:
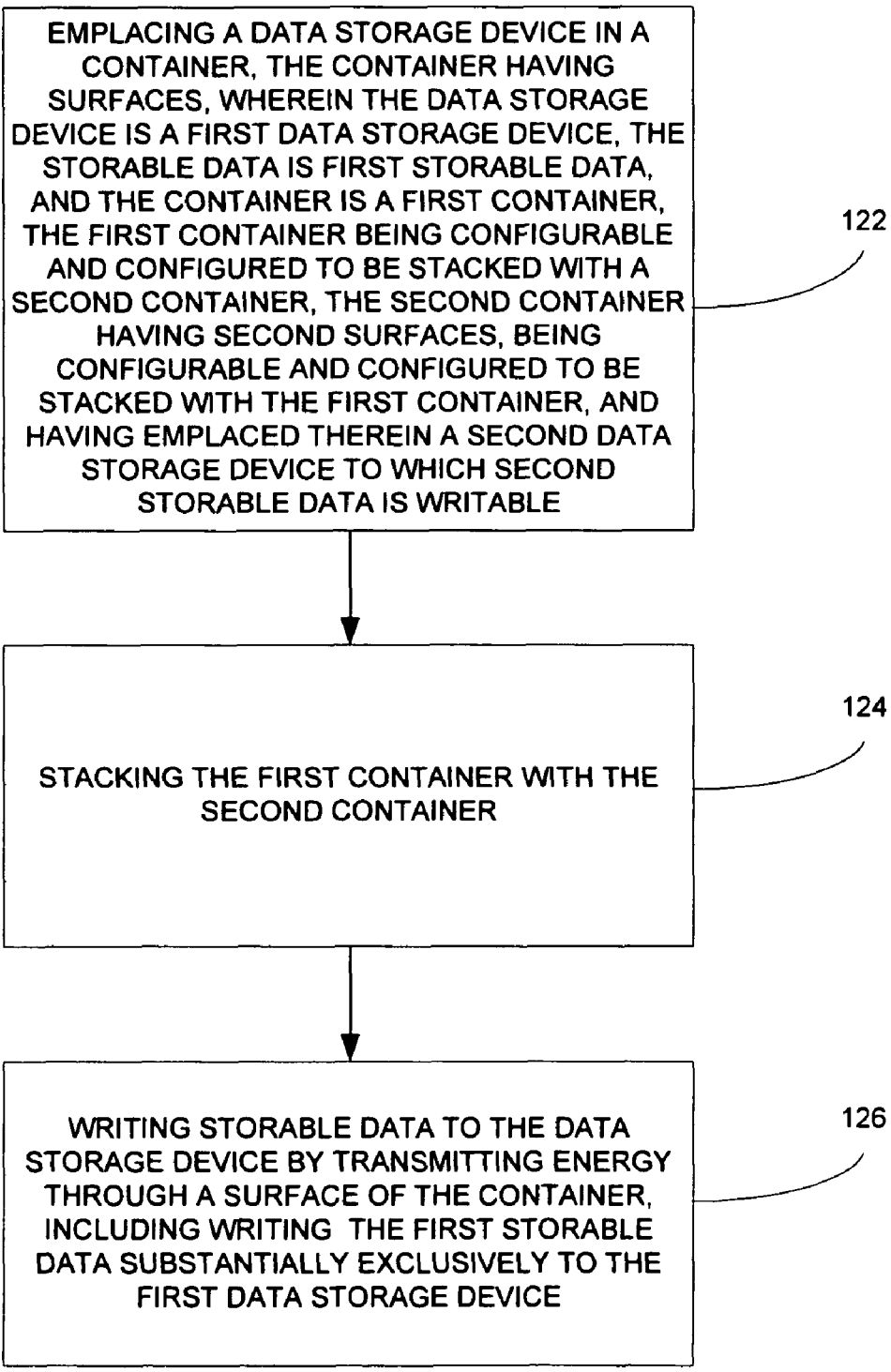
FIG. 12 is a flowchart depicting another embodiment.

FIG. 12 shows another embodiment, a method of storing a data storage device, including steps 122 and 124 and, in addition, step 126, writing storable data to the data storage device by transmitting energy through a surface of the container, wherein the writing storable data includes writing the first storable data substantially exclusively to the first data storage device.

Figure 13:
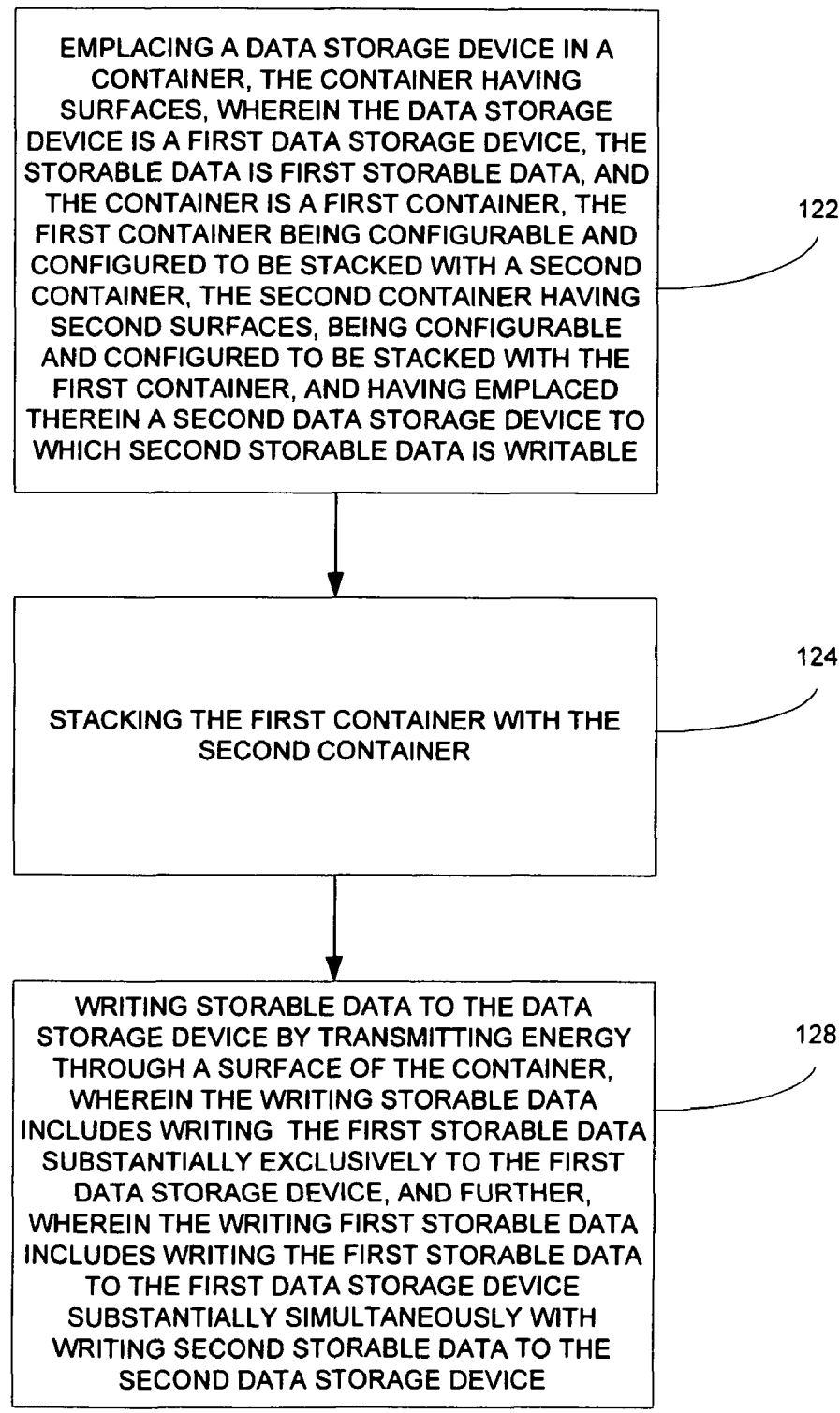
FIG. 13 is a flowchart depicting another embodiment.

FIG. 13 illustrates another embodiment, a method of storing a data storage device, including steps 122 and 124 and in addition, step 128, writing storable data to the data storage device by transmitting energy through a surface of the container, wherein the writing storable data includes writing the first storable data substantially exclusively to the first data storage device, and further, wherein the writing first storable data includes writing the first storable data to the first data storage device substantially simultaneously with writing second storable data to the second data storage device.

Figure 14:
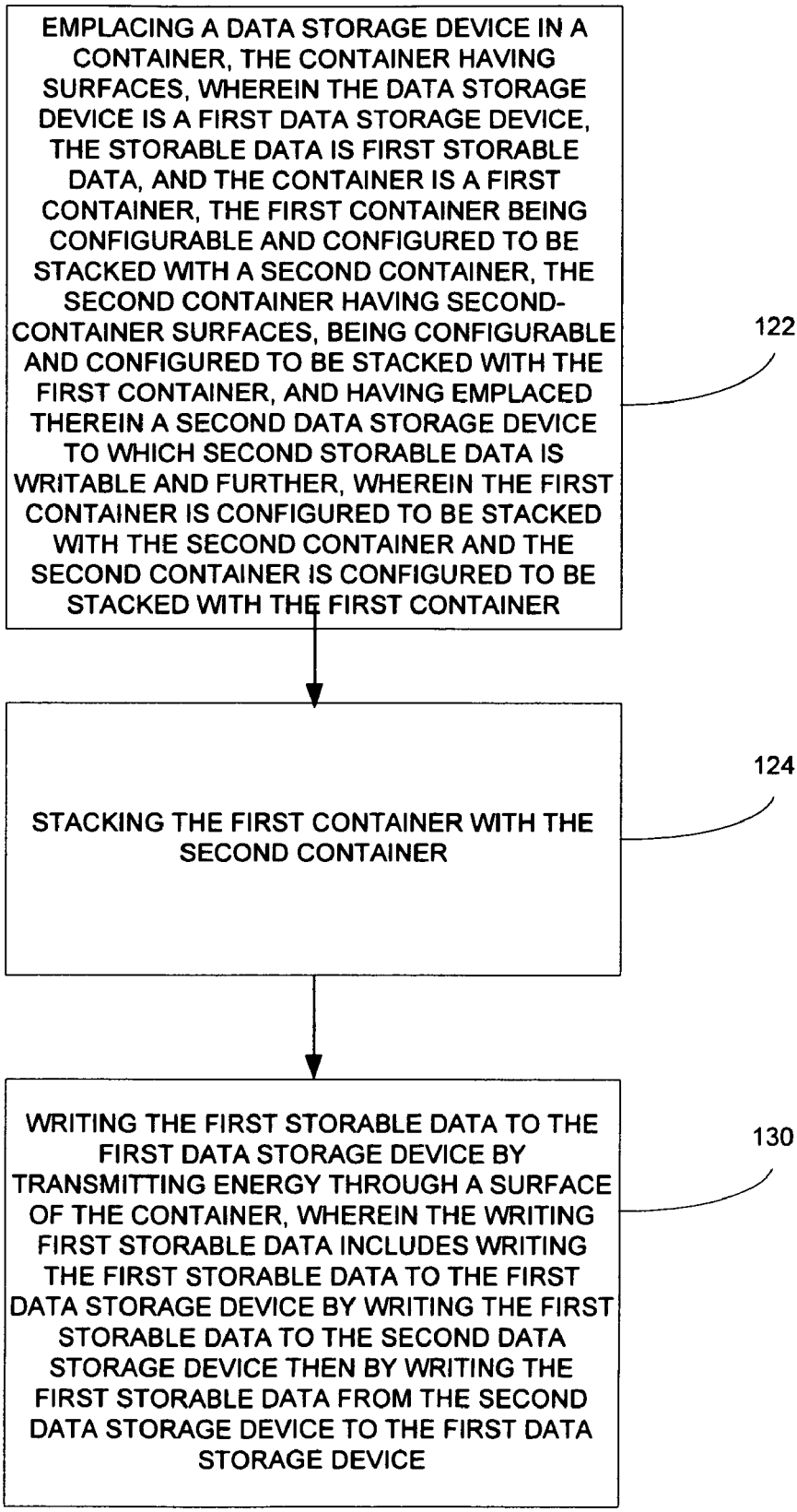
FIG. 14 is a flowchart depicting another embodiment.

FIG. 14, depicts another embodiment, a method of storing a data storage, including steps 122 and 124 and, in addition, step 130, writing the first storable data to the first data storage device by transmitting energy through a surface of the container, wherein the writing first storable data includes writing the first storable data to the first data storage device by writing the first storable data to the second data storage device then by writing the first storable data from the second data storage device to the first data storage device.

Figure 15:
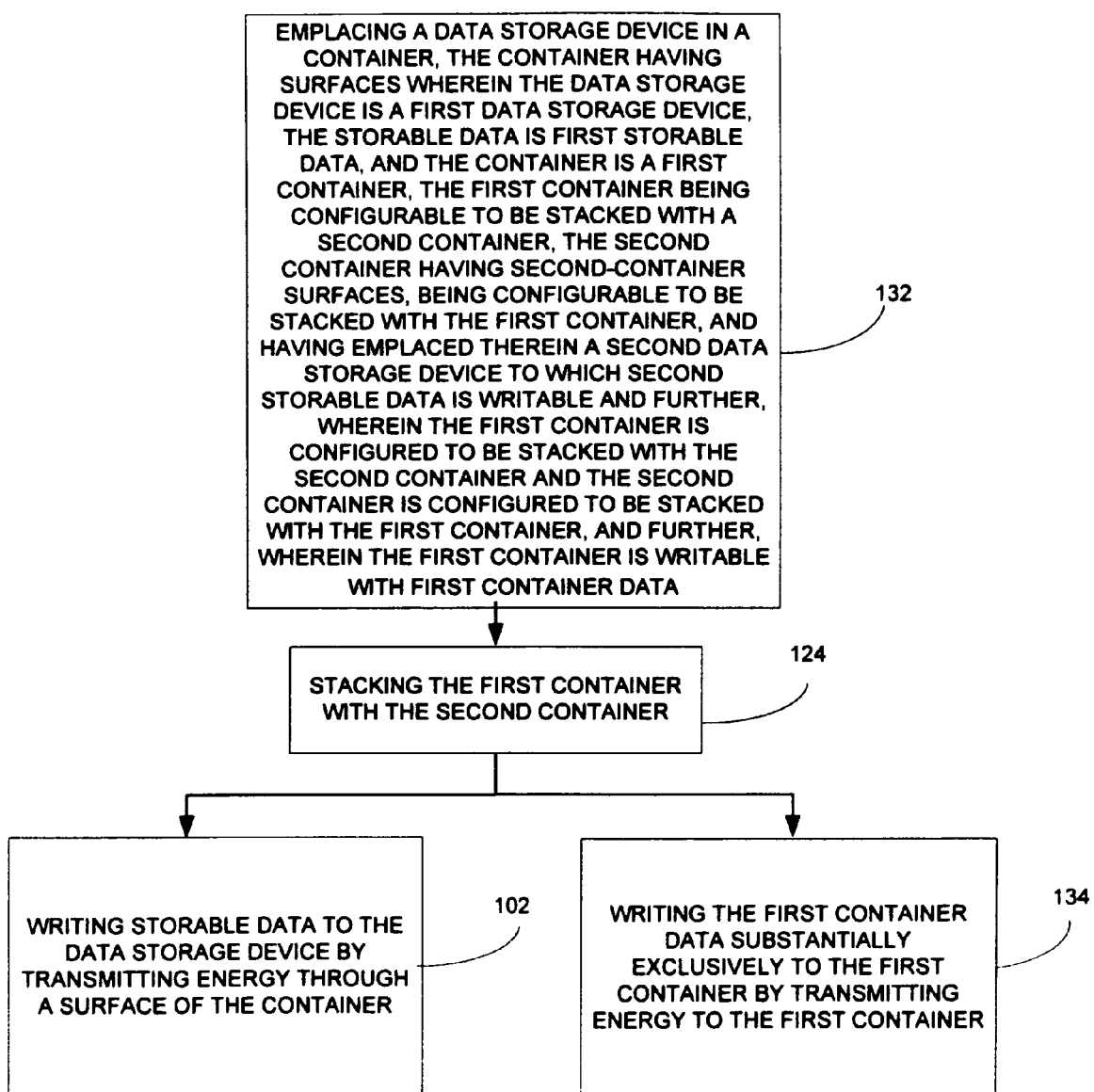
FIG. 15 is a flowchart depicting another embodiment.

FIG. 15 depicts another embodiment, a method of storing a data storage, including steps 102 and 124 and, in addition, step 132, emplacing a data storage device in a container, the container having surfaces wherein the data storage device is a first data storage device, the storable data is first storable data, and the container is a first container, the first container being configurable to be stacked with a second container, the second container having second-container surfaces, being configurable to be stacked with the first container, and having emplaced therein a second data storage device to which second storable data is writable, and further, wherein the first container is configured to be stacked with the second container and the second container is configured to be stacked with the first container, and further, wherein the first container is writable with first container data. Also further depicted is step 134, writing the first container data substantially exclusively to the first container by transmitting energy to the first container. For example, writing a shipping label onto the first container.

Figure 16:
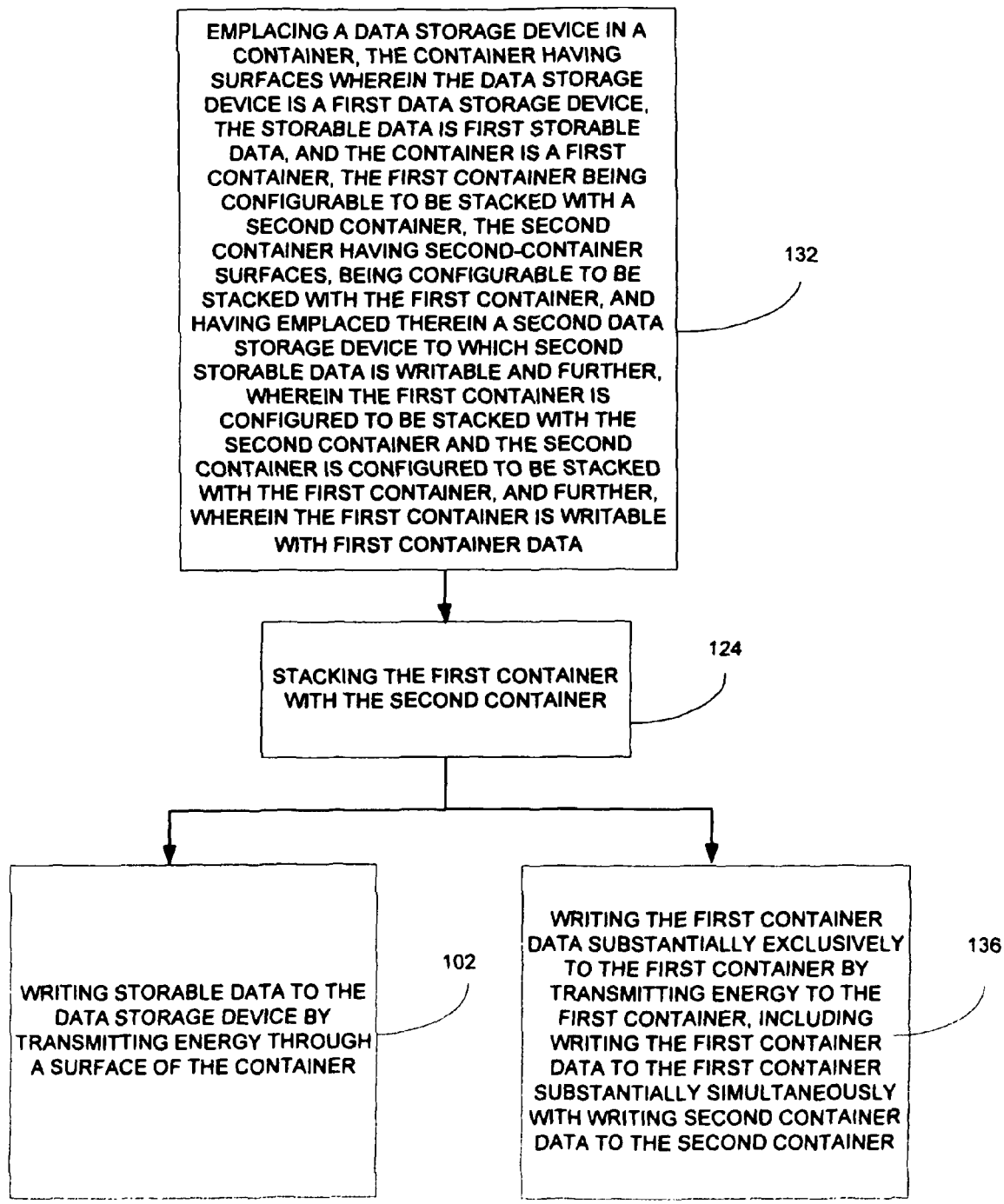
FIG. 16 is a flowchart depicting another embodiment.

FIG. 16 shows another embodiment, a method of storing a data storage device, including steps 102, 124, 132, and in addition, step 136, writing the first container data substantially exclusively to the first container by transmitting energy to the first container, wherein the writing the first container data includes writing the first container data to the first container substantially simultaneously with writing second container data to the second container.

Figure 17:
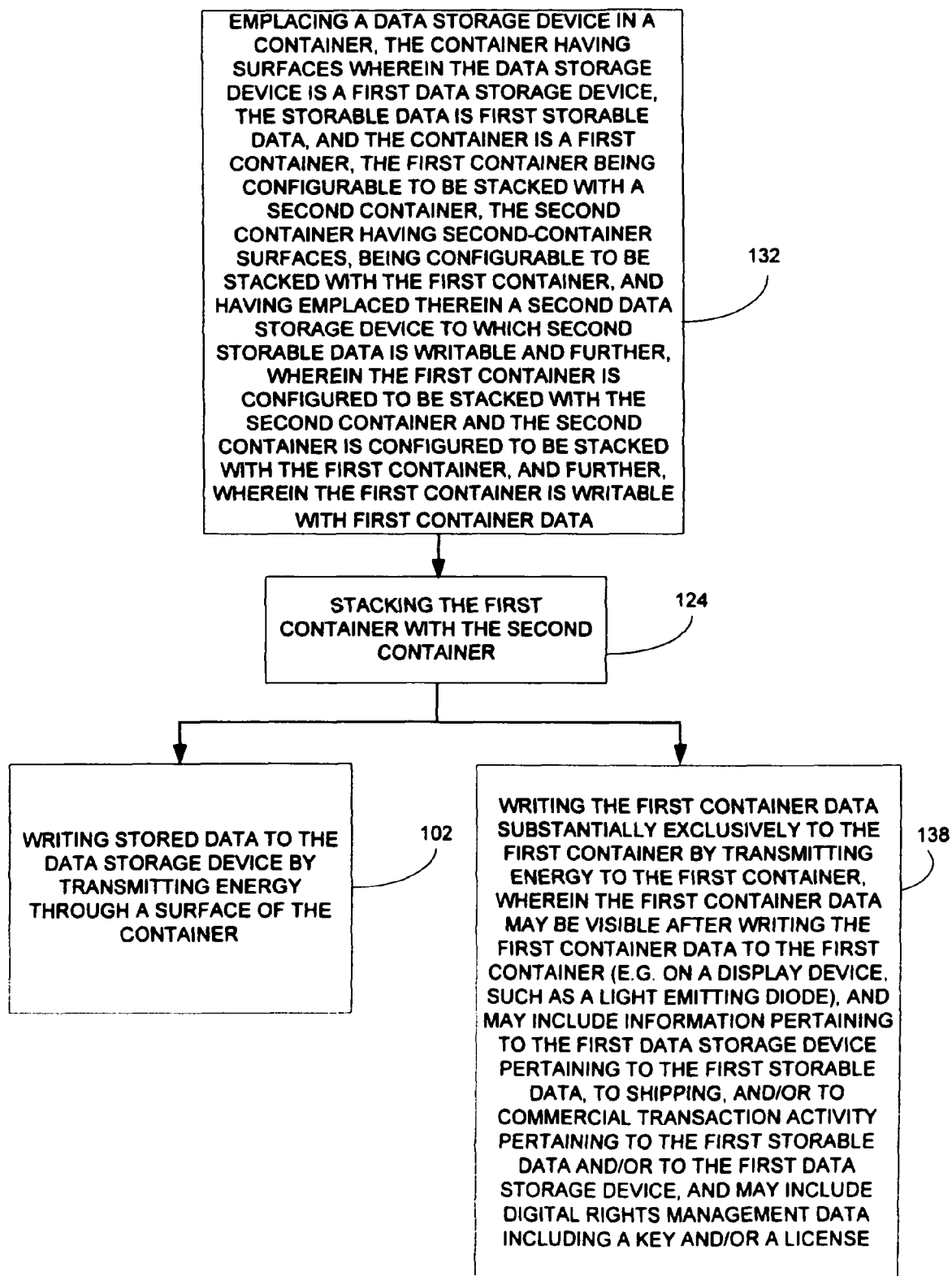
FIG. 17 is a flowchart depicting another embodiment.

FIG. 17 illustrates another embodiment, a method of storing a data storage device, including steps 102, 124, 132, and, in addition, step 138, writing the first container data substantially exclusively to the first container by transmitting energy to the first container, wherein the first container data may be visible after the writing the first container data to the first container, e.g. on a display device included in the first container, such as a light-emitting diode. The first container data may include information pertaining to the first data storage device, pertaining to the first storable data, pertaining to shipping, pertaining to commercial transaction activity such as display, sale, or rental of the first storable data and/or the first data storage device. The first container data may also include digital rights management data, e.g., a key and/or a license.

Figure 18:
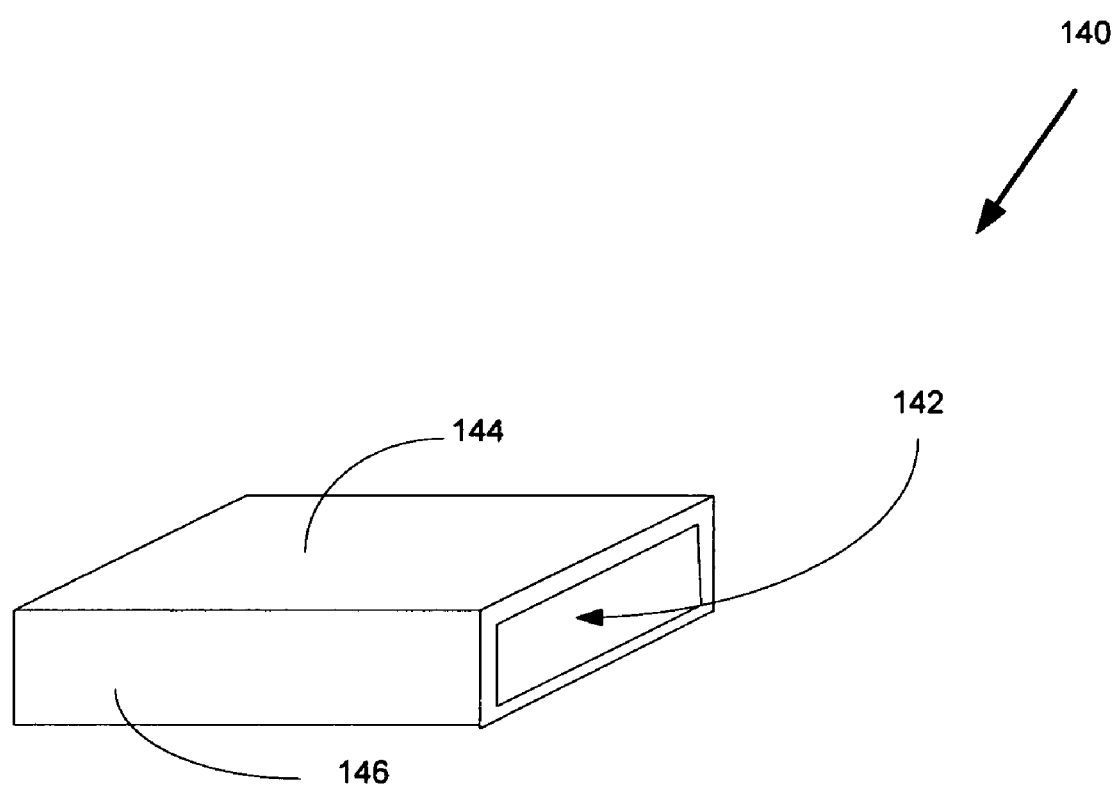
FIG. 18 is a block diagram of another embodiment.

Shown in FIG. 18 is another embodiment, a container 140 for a data storage device, including a receptacle 142 configured to receive the data storage device; and at least one data storage surface 144 through which storable data may be written to the data storage device by transmitted energy after the digital storage device is received. The container 140 may further include at least one container data surface 146 on which container data may be written by use of transmitted energy. The container 140 may be suitable for shipping the data storage device and may include plastic and/or cardboard. Further, the container 140 may be suitable for commercial transaction activity such as display, sale or rental, and may include plastic and/or cardboard. The transmitted energy used to write the storable data may include electromagnetic energy, e.g., radio frequency energy and/or optical frequency energy, and may include magnetic energy. Previously stored data on the data storage device received by the container may be read using electromagnetic energy, e.g., radio frequency energy and/or optical frequency energy, and may be read using magnetic energy. The container 140 is configured to receive a data storage device that may include, e.g., a rotating magnetic storage device, an optical storage device, and/or a flash memory. The container 140 is configured to receive a data storage device that is powerable when received by the container 140 using, e.g., induction and/or a mechanical connection. The storable data that may be written to the data storage device received by the container 140 may be digital rights management data including, e.g., a key and/or license.

Figure 19:
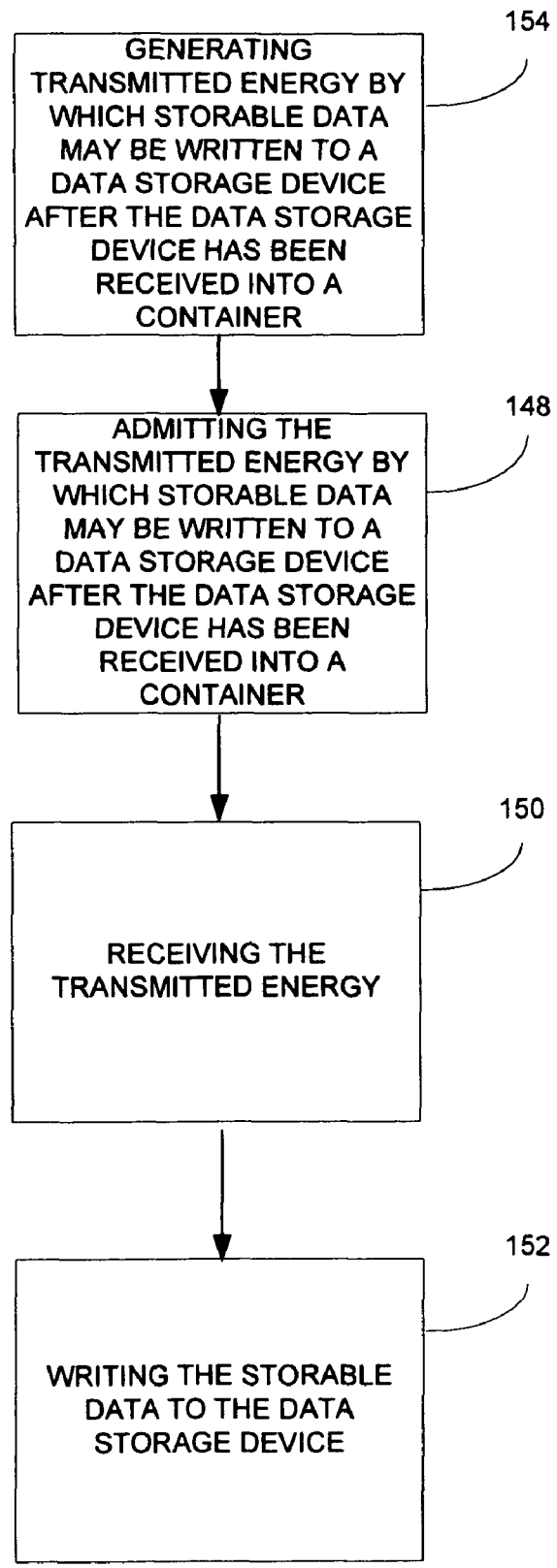
FIG. 19 is a flowchart depicting another embodiment.

FIG. 19 illustrates a method that includes admitting transmitted energy by which storable data may be written to a data storage device after the data storage device has been received into a container (step 148); receiving the transmitted energy (step 150); and writing the storable data to the data storage device (step 152). The method may also include step 154, generating the transmitted energy.

Figure 20:
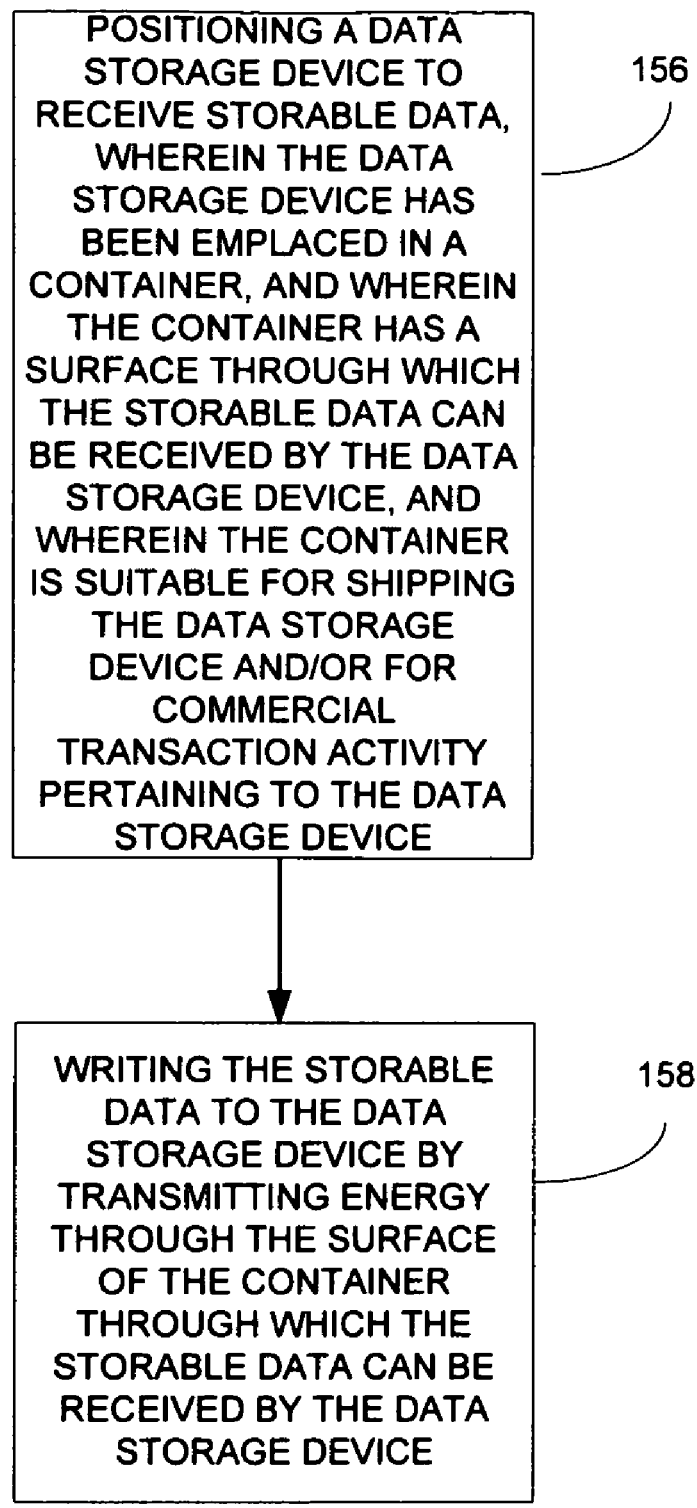
FIG. 20 is a flowchart depicting another embodiment.

FIG. 20 shows a method of storing data on a data storage device emplaced in a container including positioning a data storage device to receive storable data, wherein the data storage device has been emplaced in a container, and wherein the container has a surface through which the storable data can be received by the data storage device (step 156); and writing the storable data to the data storage device by transmitting energy through the surface of the container through which the storable data can be received by the data storage device (step 158). The container may be suitable for shipping the data storage device and/or for commercial transaction activity pertaining to the data storage device.

Steps 100, 104, 110, 112, 116, 120, 122, 132, 148 and 156 as described above may be performed with, e.g., the container 140, and steps 102, 108, 114, 118, 126, 128, 130, 134, 136, 138, 150, 152, 154 and 158 as described above may be performed, e.g., with a computer apparatus for writing storable data by transmitting energy to the data storage device emplaced in the container 140. Step 124 as described above may be performed, e.g., manually or with an apparatus for manipulating containers such as the container 140.

One skilled in the art will recognize that the foregoing components (e.g., steps), devices, and objects in FIGS. 1-20 and the discussion accompanying them are used as examples for the sake of conceptual clarity and that various configuration modifications are common. Consequently, as used herein, the specific exemplars set forth in FIGS. 1-20 and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote computing/communication systems, combined with standard engineering practices. Specific examples of such components entail such as Intel Corporation's mote components and supporting hardware, software, and firmware as well as the Defense Advanced Research Project's (DARPA's) network embedded sensor technologies.

All of the above U.S. patents, U.S. patent application publications, U.S. patent applications, foreign patents, foreign patent applications and non-patent publications referred to in this specification and/or listed in any Application Data Sheet, incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Other embodiments are within the following claims.

We claim:

1. A container for a data storage device, comprising:
a receptacle configured to receive the data storage device; and
at least one data storage surface through which storable data is written to the data storage device by transmitted energy after the data storage device is received.

2. The container of claim 1, wherein the container is suitable for shipping the data storage device.

3. The container of claim 2, wherein the container includes plastic.

4. The container of claim 2, wherein the container includes cardboard.

5. The container of claim 1, wherein the container is suitable for commercial transaction activity.

6. The container of claim 5, wherein the commercial transaction activity pertains to the data storage device.

7. The container of claim 5, wherein the commercial transaction activity pertains to the storable data.

8. The container of claim 5, wherein the container includes plastic.

9. The container of claim 5, wherein the container includes cardboard.

10. The container of claim 1, wherein the transmitted energy includes electromagnetic energy.

11. The container of claim 10, wherein the electromagnetic energy includes radio frequency energy.

12. The container of claim 10, wherein the electromagnetic energy includes optical frequency energy.

13. The container of claim 1, wherein the transmitted energy includes magnetic energy.

14. The container of claim 1, wherein previously stored data on the data storage device received by the container is read using electromagnetic energy.

15. The container of claim 14, wherein the electromagnetic energy is radio frequency energy.

16. The container of claim 14, wherein the electromagnetic energy is optical frequency energy.

17. The container of claim 1, wherein previously stored data on the data storage device received by the container is read using magnetic energy.

18. The container of claim 1, wherein the container is configured to receive a data storage device including a rotating magnetic storage device.

19. The container of claim 1, wherein the container is configured to receive a data storage device including an optical storage device.

20. The container of claim 1, wherein the container is configured to receive a data storage device including a flash memory.

21. A container for a data storage device, comprising:
a receptacle configured to receive the data storage device; and
at least one data storage surface through which storable data is written to the data storage device by transmitted energy after the data storage device is received,
wherein the container is configured to receive a data storage device that is powerable when received by the container.

22. The container of claim 21, wherein the data storage device is powerable using induction.

23. The container of claim 21, wherein the data storage device is powerable using a mechanical connection.

24. The container of claim 1, wherein the storable data includes digital rights management data.

25. The container of claim 24, wherein the digital rights management data includes a key.

26. The container of claim 24, wherein the digital rights management data includes a license.

27. The container of claim 1, further comprising at least one container data surface on which container data is written by transmitted energy.

28. A system of containing a data storage device, comprising:
a container including a receptacle to receive the data storage device, the container including at least one data storage surface through which storable data is written to the data storage device by transmitted energy after the data storage device is received;
circuitry for receiving the transmitted energy; and
circuitry for writing the storable data to the data storage device.

29. The system of claim 28, further comprising:
circuitry for generating the transmitted energy.

30. A method comprising:
admitting transmitted energy through a surface of a container by which storable data is written to a data storage device after the data storage device has been received into the container;
receiving the transmitted energy; and
writing the storable data to the data storage device.

31. The method of claim 30, further comprising:
generating the transmitted energy.

32. A system comprising:
means for receiving a data storage device, including means for admitting transmitted energy through a surface of the means for receiving a data storage device by which storable data is written to the data storage device after the data storage device is received by the means for receiving the data storage device;
means for receiving the transmitted energy; and
means for writing the storable data to the data storage device.

33. The system of claim 32, further comprising means for generating the transmitted energy.

34. A method of storing data on a data storage device emplaced in a container, comprising:
  positioning a data storage device to receive storable data, wherein the data storage device has been emplaced in a container, and wherein the container has a surface through which the storable data is received by the data storage device; and
  writing the storable data to the data storage device by transmitting energy through the surface of the container through which the storable data is received by the data storage device.

35. The method of claim 34, wherein the container is suitable for shipping the data storage device.

36. The method of claim 34, wherein the container is suitable for commercial transaction activity pertaining to the data storage device.

37. A system of storing data on a data storage device emplaced in a container:
  circuitry for emplacing a data storage device in a container, the container having surfaces; and
  circuitry for writing storable data to a data storage device emplaced in the container by transmitting energy through a surface of the container.

* * * * *